March 14, 1933.  H. E. TWOMLEY  1,901,066
CONVEYER SYSTEM
Filed Feb. 21, 1931  4 Sheets-Sheet 3

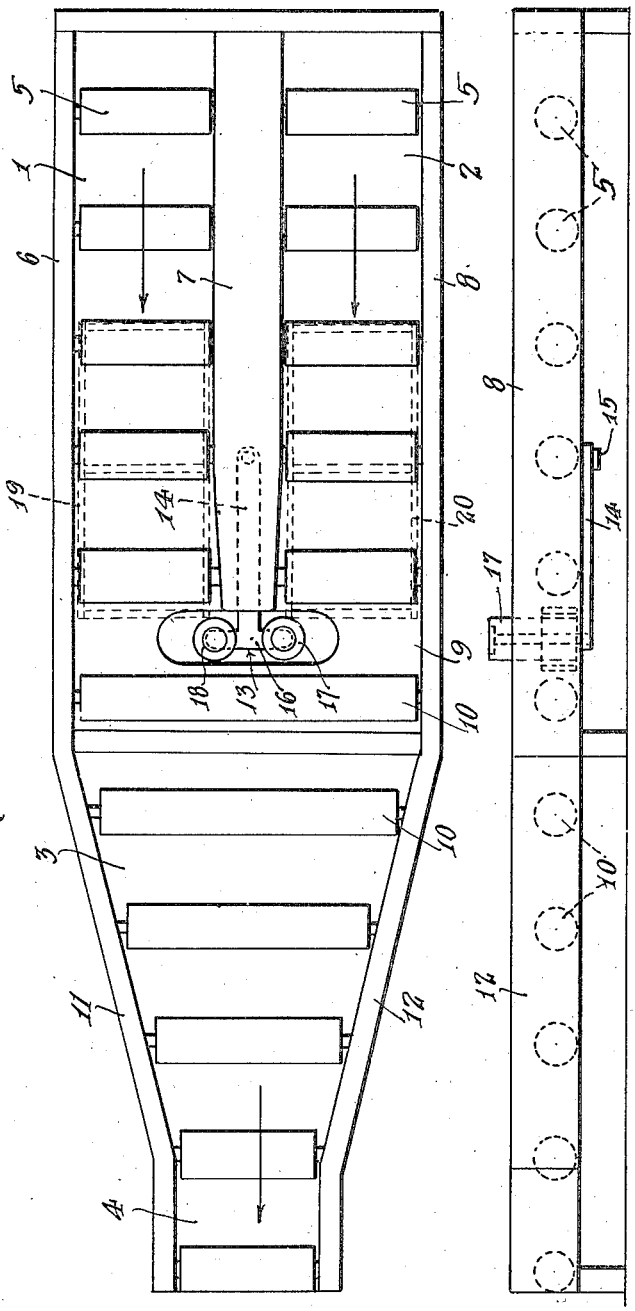

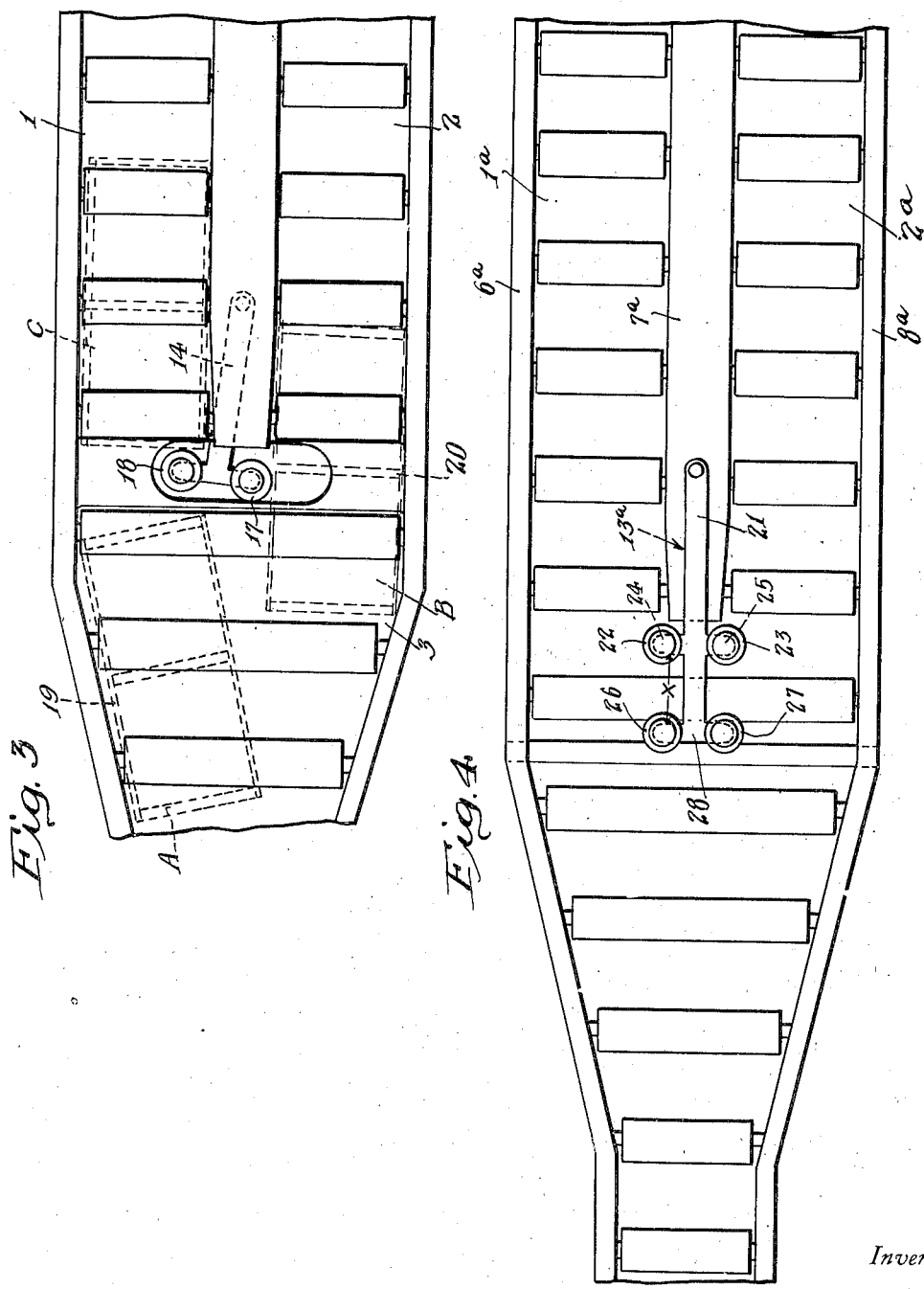

Inventor
Herbert E. Twomley
By Lyon & Lyon
Attorneys

March 14, 1933. H. E. TWOMLEY 1,901,066
CONVEYER SYSTEM
Filed Feb. 21, 1931 4 Sheets-Sheet 4
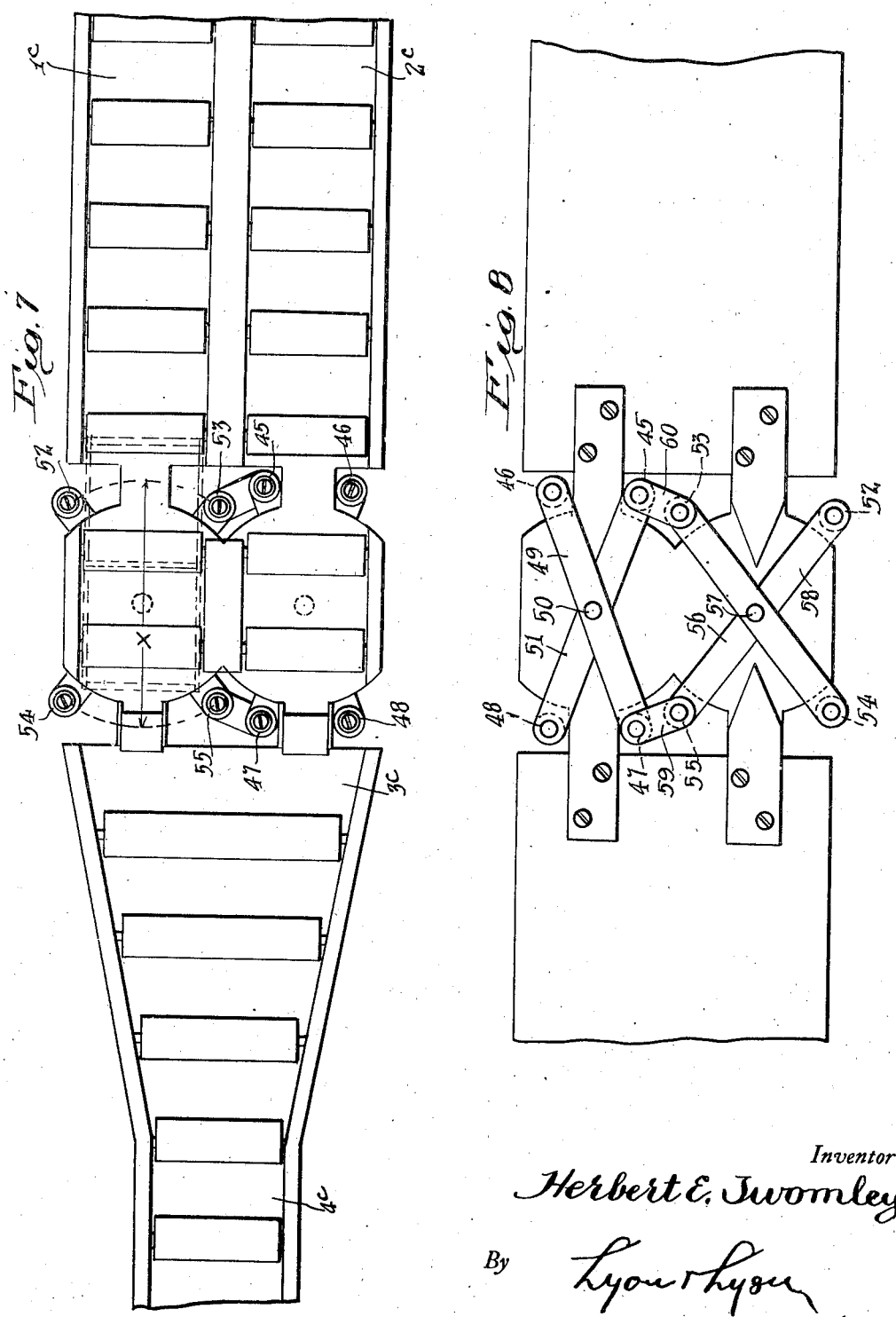
Inventor
Herbert E. Twomley
By Lyon & Lyon
Attorneys Patented Mar. 14, 1933

1,901,066

UNITED STATES PATENT OFFICE

HERBERT E. TWOMLEY, OF RIVERSIDE, CALIFORNIA, ASSIGNOR TO CLARA B. PARKER, EXECUTRIX OF GEORGE D. PARKER, DECEASED

CONVEYER SYSTEM

Application filed February 21, 1931. Serial No. 517,397.

My invention relates to roller conveyers and has particular reference to a device for preventing collisions between packages or other articles moving along two separate chutes which terminate in a single opening or continuation of the conveyer system.

In roller conveyers, it is common practice to have conveyers extending from several spaced points to a common conveyer chute upon which packages or parcels from such different points will be conveyed along the continuation of the chute. Ordinarily, the continuation of the chute is formed to accommodate in its width only the same size of package or parcel as was accomodated by either one of the feeder chutes or conveyers so that it is necessary to provide some means at the junction of the feeder chutes to prevent collision between the parcels arriving from the different conveyers.

It is, therefore, an object of my invention to provide means for a branched conveyer chute to prevent collision between parcels arriving simultaneously at the junction of the chutes.

Another object of my invention is to provide a branched conveyer chute with means for positively stopping parcels on either of the chutes to thereby prevent collision between parcels from different chutes attempting to enter the junction at the same time.

Another object of the invention is to provide a branched conveyer chute with means for positively stopping parcels passing along the chutes to prevent collision thereof at the junction of the chutes and to insure the clearance of any given parcel entering from one chute before parcels are permitted to enter from the other chute.

Other objects and advantages will be apparent from a study of the following specification, read in connection with the accompanying drawings, wherein Figure 1 is a plan view of a branched conveyer chute of the roller type provided with means for preventing collision of parcels entering the junction from both of the chutes;

Fig 2 is a side elevational view of the conveyer illustrated in Fig. 1;

Fig. 3 is a plan view of the conveyer illustrated in Fig. 1, illustrating the stopping device in one of its operative postions;

Fig. 4 is a plan view of a conveyer chute similar to that shown in Fig. 1, but provided with a modified form of the stopping device;

Fig. 7 is a plan view of a conveyer chute similar to that illustrated in Fig. 1, but provided with a still further modified form of the stopping device; and Fig. 8 is an inverted plan view of the device illustrated in Fig. 7.

Figure 5:
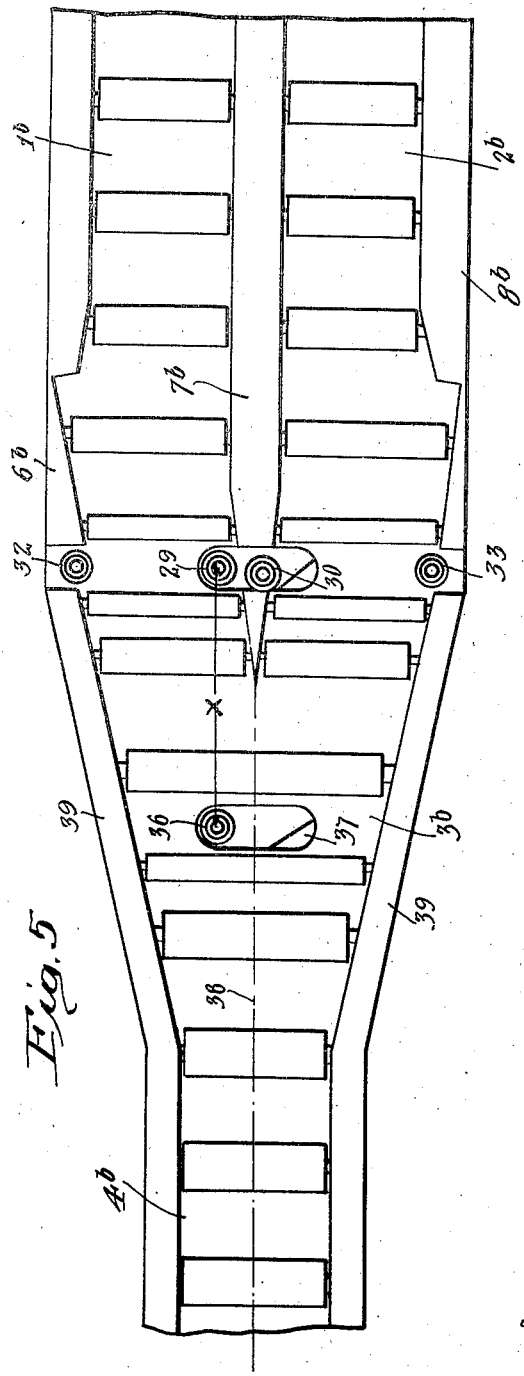
Fig. 5 is a plan view of a conveyer chute similar to that shown in Fig. 1, but illustrated as being provided with a still further modified form of stopping device.

Referring to the drawings, I have illustrated in Fig 1, a branched conveyer as comprising a pair of feeder chutes 1 and 2, a second one of which is illustrated, it being understood that these feeder conveyers extend from certain stations in a factory or other establishment where the conveyer is employed, at which stations parcels, boxes or packages, or other articles, will be placed upon one or the other of the conveyer chutes. While the chutes 1 and 2 are illustrated as being very close together, it is assumed that these two chutes may extend from widely separated points, if desired.

The conveyer chutes 1 and 2 are illustrated as discharging into a junction 3 which constitutes the entrance of a continuation of the conveyer by way of a continuing chute 4. It is assumed that the direction of movement of parcels upon the conveyer is in the direction of the arrows appearing on Fig. 1.

The type of conveyer illustrated is that known as a roller conveyer, each of the conveyer chutes being provided with a plurality of rollers 5, which may be driven in any suitable manner and which are arranged with their axes substantially parallel to each other and at right angles to the direction of motion of parcels to be conveyed thereover. Parcels are prevented from slipping from the rollers 5 as by means of the guide rails 6, 7 and 8, of which rail 7 is indicated in Fig. 1 as constituting a joint rail for both chutes 1 and 2.

The junction 3 is illustrated as comprising a substantially funnel-like conveyer, its inner or approaching end 9 being constructed with a width equal to the sum of the width of the feeder chutes 1 and 2 so that provision is made to permit simultaneous entry of parcels from both of the chutes 1 and 2. This junction 3 is also illustrated as being provided with rollers 10, each of which is mounted and driven similar to those indicated at 5 but the length of which corresponds substantially to the width of the conveyer junction section.

As will be readily apparent from an inspection of Fig. 1, the guides 11 and 12, constituting the sides of the junction 3, are positioned angularly relative to each other to guide parcels entering the junction into the proper position to enter the continuing chute 4. The continuing chute 4 is constructed similarly to either the chute 1 or 2 and is illustrated as being of a width substantially equal to the width of either one of the feeder chutes.

If parcels were permitted to pass simultaneously from both of the chutes 1 and 2 into the junction 3, it would be readily apparent that these parcels would engage the guides 11 and 12 and would be brought into contact with each other with the result that the junction 3 would become blocked and thus prevent any of the parcels from passing into the continuing chute 4.

To prevent such blocking or jamming of the junction 3, I have illustrated a stopping device 13 as comprising a relatively T-shaped arm 14 pivoted at the outstanding end of the stem of the T to the underneath side of the guide rail 7, as is indicated by the pivot pin 15. Upon each of the ends of the cross bar 16 of the T 14, I have illustrated a roller, that mounted upon the right hand side of the cross bar being designated by the reference character 17, while that upon the left hand side is indicated by the reference character 18. The length of the cross bar 16 is such that when the T bar 14 is in its central position, as is illustrated in Fig. 1, the rollers 17 and 18 are both in position to project into the path of parcels 19 entering from the feeder chute 1, or parcels 20 entering from the feeder chute 2.

By referring particularly to Fig. 2, it will be observed that the rollers 17 and 18 are constructed of such length as to project a considerable distance vertically to insure substantial contact between the rollers and the parcels passing over the feeder chute.

By referring to Fig. 3, the operation of this form of my device will be apparent. Assuming that a number of parcels 19 are passing along the feeder chute 1, while a number of similar parcels 20 are passing along the feeder chute 2, the arrival of these two groups of parcels at the junction 3 will engage the rollers 17 or 18 and move the T bar 14 to one side or the other to clear the path for one set of parcels or the other. That is, the parcel first to arrive at the junction 3 will engage its associated roller on the T bar and move the T bar to the proper position to obstruct the path for parcels from the opposite chute and also remove the roller from the chute in which such parcel is being conveyed.

In the embodiment of my device illustrated, the parcels to be conveyed are indicated as boxes of the character employed for transporting fruit, such as oranges, and similar products. In Fig. 3 the parcel indicated by the letter A was assumed to have been the first to arrive at the junction 3 and it arrived from the feeder chute 1. Under these conditions, the T bar 14 would have been moved to such position as to obstruct the passage of the box indicated by the letter B, constituting one of the group of parcels which is fed over the opposite feeder conveyer 2. However, as soon as the box A had moved into the junction 3, a sufficient distance to permit the rear end thereof to pass out of engagement with the roller 18, the box B on the feeder chute 2, which at this time has been pressed into engagement with the roller 17, will by such pressure throw the T bar 14 to the left into the position illustrated in Fig. 3, to thus permit the box B to pass into the junction 3, while obstructing the passage of further boxes, such as that indicated by the reference character C, entering from the feeder conveyer 1.

By positively stopping the boxes in either one or the other of the chutes 1 and 2, collision of the boxes from these two chutes is eliminated, since boxes from only one of the conveyers are permitted to enter the junction at any one time.

It is obvious that in the event a number of boxes upon one chute are in abutment with each other and are thus following each other so closely as to allow no space for the roller 18 to be thrown into obstructing position, all of such boxes would be passed into the junction 3 before any of the boxes from the opposite conveyer would be permitted to enter.

By referring, particularly, to Fig. 4, it will be observed that feeder chutes 1a and 2a are constructed similarly to those described with reference to Figs. 1, 2 and 3, these conveyers having guides 6a, 7a and 8a similar to those described with reference to Fig. 1.

In Fig. 4, I have illustrated a stopping device 13a as comprising a bar 21 provided with four rollers similar to rollers 18 and 19 shown in Fig. 1. However, in the former device illustrated in Fig. 4, these rollers are arranged in two spaced groups, the rollers 22 and 23 being mounted upon projecting bosses 24 and 25, respectively, extending upon opposite sides of the bar 21. An additional set of rollers 26 and 27 are illustrated as respectively mounted upon opposite ends of a cross bar 28 which is spaced considerably in advance of the bosses 24 and 25. The amount of this extension is indicated by the line marked X and is preferably selected to conform with the particular types of boxes or parcels for which the conveyer system is to be employed. For example, when the conveyer is adapted to pass boxes of a definite length or distance X should be substantially equal to the length of one of the parcels.

With this arrangement, it will be observed that a box entering from the chute 1a would engage the roller 22 with its front end, thus moving the bar 21 to the right to place the roller 23 in the obstructing position in the chute 2a. The box from chute 1a would then pass into the junction 3a. However, a box approaching from conveyer 2a striking the roller 23 would not be enabled to move the bar 21 to its left hand position until the rear end of the first box had cleared the roller 26. Thus ample space is provided to permit the first box to move a sufficient distance along the junction 3a before the next box is permitted to enter. The value of such spacing will be apparent from an observation of the converging sides of the junction 3a which in the event that the second box was released as soon as the first box had passed the roller 22, might enter the junction 3a and be moved to the left at such time as to engage the side of the first box or the end thereof with sufficient force to damage the box or to jam the two boxes in the conveyer; however, until after the first box has moved further into the junction 3a such side collision is prevented.

By referring particularly to Fig. 5 a modified form of the spacing and stopping device illustrated in Fig. 4 is shown in which feeder chutes 1b and 2b, constructed similarly to the chutes illustrated in Figs. 1 and 4, terminate in a junction 3b constituting the entrance to a continuing conveyer 4b.

In this form of my invention, side rollers 32 and 33 are inset respectively in the guides 6b and 8b to facilitate passage of parcels through their angular motion upon entry into the junction 3b. It will be observed that when a parcel engages roller 30 and moves the plate 31 to the left, the distance between the rollers 30 and 33 will be such as to permit passage of the parcel therebetween.

It will be observed that a second plate 34, similar to plate 31, is illustrated as being pivotally mounted as at 35 somewhat beyond the plate 31. Secured to the plate 34 is a single roller 36 which projects upwardly through a slot 37 in the conveyer floor to such position as will permit it to engage parcels passing over the conveyer through the junction 3b. The roller 36 is permitted a limited movement to the right and to the left of the center line 38 through the junction 3b by such a distance as will permit a parcel or box to pass between it and the opposite guide 39 on the junction 3b. That is, in the position illustrated in Fig. 5, the roller 36 will permit a parcel from the chute 2b to pass between the roller 36 to the guide 39.

Figure 6:
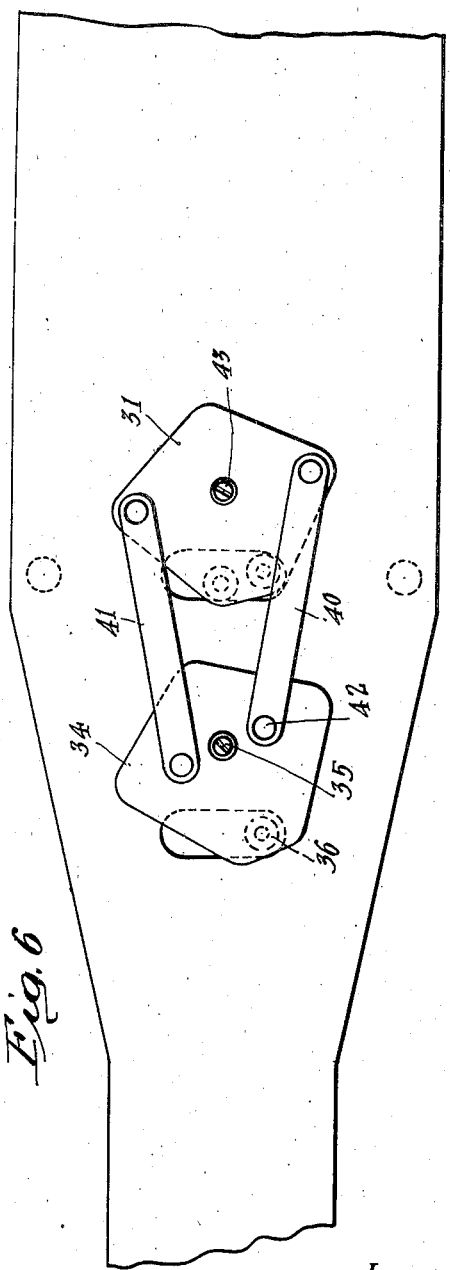
Fig. 6 is an inverted plan view of the chute and stopping device illustrated in Fig. 5.

By referring again to Fig. 6, it will be observed that the plate 34, to which the roller 36 is attached, is connected to the plate 31 supporting rollers 29 and 30 as by means of a pair of connecting links 40 and 41. These links are each pivotally secured to the plate 34 as is indicated at 42 at some distance laterally from the pivot 35 of the plate 34. Correspondingly, the opposite end of the link 40 is connected to the plate 31 at a point laterally spaced from the pivot 43 for this plate. The selection of the distances of spacing of the links 40 and 41 from the pivot points of the plates to which they are attached, may be variably selected to insure that a desired movement of the rollers 29 and 30 produces a corresponding desired movement of the roller 36.

The amount of space in the longitudinal direction between the rollers 29—30 and roller 36 (indicated by the arrow X on Fig. 5), is selected to correspond to the length of the parcel or box to be handled by the conveyer.

The operation of this form of the device is similar to that described with reference to Fig. 4 in that a parcel approaching on the feeder chute 2b will engage the roller 30, move the plate 31 to the left so as to permit passage of the parcel between rollers 30 and 33 and thus allow the parcel to enter the junction 3b. Displacement of the rollers 29 and 30 will, through the linked connection 40—41 to the plate 34, cause a simultaneous movement of the roller 36 to its left hand position to permit the parcel to pass between the roller 36, guide 39 and thus pass to the continuing conveyer 4b. However, during the passage of the parcel from rollers 30—33 to a point at which it clears the roller 36, any parcels approaching upon the feeder chute 1b, will be prevented from entering the junction 3b even though they should strike roller 29. In other words, the impact upon roller 29 will not move the rollers 29—30 to the right until after the first parcel has cleared the roller 36. Thus the first parcel to enter the junction will positively prevent the entry of a parcel from the other feeder chute until this first parcel has cleared the junction 3b a sufficient distance to insure against sideways collision by parcels from the opposite chute.

Referring particularly to Figs. 7 and 8, I have illustrated a still further modification of the stopping device in which a pair of feeder conveyers 1c and 2c are arranged to individually pass parcels to a junction 3c from which the parcels pass to a continuing conveyer 4c.

The stopping device preventing collision of the parcels comprises a pair of rollers 45 and 46 associated with the feeder chute 2c and a corresponding set of rollers 47 and 48 also associated with the feeder chute 2c but spaced from rollers 45—46 in the direction of motion of the parcels over this chute.

By referring, particularly, to Fig. 8, it will be observed that rollers 46 and 47 are mounted upon opposite ends of a lever 49, which lever is pivoted at its center 50 to the underneath side of the floor of the conveyer. In like manner rollers 45 48 are mounted at opposite ends of a second lever 51 also pivoted at its center at 50 to the underneath side of the conveyer. The entry of a parcel from chute 2c impacting the rollers 45 and 46 will move these rollers away from each other to permit the parcel to pass therethrough while the rollers 47 and 48 will be simultaneously moved apart to permit the passage of the parcel through these rollers.

Referring again to Fig. 7, it will be observed that a similar group of rollers is associated with this chute, the rearmost rollers being designated by the reference characters 52 and 53 while the foremost rollers are indicated by the reference characters 54 and 55. Rollers 52 and 55 are mounted upon opposite ends of a lever 56 pivoted at its center 57 while rollers 53 and 54 are mounted upon opposite ends of a lever 58 pivoted at its center 57. The entry of a parcel from chute 1c will cause the rollers 52 and 53 to be moved apart, thus causing a simultaneous displacement of the rollers 54 and 55.

By referring particularly to Fig. 8, it will be observed that the levers 49 and 56 are connected together at their adjacent ends by means of a link 59 while levers 51 and 58 are similarly connected at their adjacent ends by means of a link 60 so that displacement of rollers 52, 53 causes a corresponding contraction of rollers 45 and 46 or oppositely, displacement of rollers 45 or 46 will cause contraction of rollers 52 and 53.

The operation of this form of the device is as follows: A parcel approaching upon chute 1c, such as that indicated at 61, will impact rollers 52 and 53, causing displacement thereof. The displacement of rollers 52 and 53 causes a corresponding displacement of rollers 54 and 55, as hereinbefore described, as well as causing a contraction of rollers 45 and 46 so that the passage from chute 2c is obstructed to prevent the entry of a parcel from this chute to the junction 3c.

The obstruction of the chute 2c is maintained until after the parcel or box 61 has passed not only clear of the rollers 52 and 53 but also until it has passed such position as will clear rollers 54 and 55. Again, the spacing of rollers 52—53 and 54—55, (indicated by the arrow maked X in Fig. 7), will be selected to correspond to the length of the parcel or box which is conveyed by the system. In other words, this distance, like that described with reference to Figs. 4 and 5, should be such as to nearly or substantially correspond to the length of the parcel or box passed over the system.

From the foregoing description, it will be observed that the underlying principle of my invention is the provision of a positive stop for one or the other of the chutes to engage and stop the parcels passing thereover to prevent simultaneous entry of parcels from both chutes, and this prevents both damage to the parcels and jamming of the conveyer system requiring manual assistance before the system may again be operated.

It will be further observed that I have provided a system in which not only such jamming is prevented, but also danger of sidewise collision is prevented by insuring the stoppage of parcels from one chute until after parcels in the other chute have moved to such distance as will insure spacing of these parcels from any other parcels entering from the opposite chute.

While I have illustrated and described the preferred embodiment of my invention, I do not desire to be limited to any of the details shown or described herein, except as defined in the appended claims.

I claim:

1. In a conveyer system in which several branch conveyers converge into a single continuing conveyer, parcel engaging stopping means for each of said branch conveyers, means mounting each of said stopping means upon its associated branch conveyer for movement into position to engage parcels on that conveyer, and means operable by arrival of a parcel at the junction from either branch conveyer for operating the stopping means in that conveyer to a non-obstructing position and for simultaneously moving the stopping means in the other conveyer to obstructing position.

2. In a conveyer system in which several branch conveyers converge into a single continuing conveyer, stopping means for obstructing said branch conveyers, said stopping means comprising a pair of obstructing members, one positioned to obstruct one of said branch conveyers and the other to obstruct the other of said branch conveyers, means mounting said obstructing means rigidly relative to each other and movable relative to said branch conveyers whereby engagement of the obstructing means in the one conveyer by a parcel in that conveyer will remove the obstructing means from that conveyer and place the obstructing means for the opposite conveyer in obstructing position.

3. In a conveyer system in which several branch conveyers converge into a single continuing conveyer, stopping means for obstructing said branch conveyers, said means comprising a pair of rollers, means mounting one of said rollers to project into the path of parcels passing over one of said branch conveyers and mounting the other of said rollers to project into the path of parcels in the opposite branch conveyer, said mounting means being movable relative to said conveyers by engagement of parcels with said rollers to one position to remove one of the rollers from the path of one of said conveyers and to project the other roller into the path of the other conveyer and to an opposite position to remove said other roller from the path of its conveyer and project said one roller into the path of its conveyer.

4. In a conveyer system in which several branch conveyers converge into a single continuing conveyer, stopping means for obstructing said branch conveyers, said stopping means comprising a pair of obstructing members, said obstructing members comprising a pair of obstructing devices for said branch conveyers, the devices of such pair being spaced from each other in the direction of movement of parcels over such conveyer system, means mounting said obstructing devices movable relative to said conveyer, and means operable by the arrival of a parcel on one of said branch conveyers for moving said obstructing device to non-obstructing position for that branch conveyer and to obstructing position for the opposite conveyer, said other of said obstructing devices preventing return of said obstructing means until said parcel has passed through the distance between the obstructing devices of said pair.

5. In a conveyer system in which several branch conveyers converge into a single continuing conveyer, stopping means for obstructing said branch conveyers, said stopping means comprising a pair of rollers for each of said branch conveyers, means mounting the pair of rollers for each conveyer in spaced relation to each other in the direction of movement of parcels over said conveyer, means movably securing said mounting means to said conveyer whereby engagement of one of the rollers associated with one of said branch conveyers will remove the rollers from the path of said parcel and move the rollers associated with the other of said branch conveyers to obstructing position.

6. In a conveyer system in which a pair of branch conveyers converge at a junction point into a single continuing conveyer, a parcel engaging obstructing device for each of said branch conveyers, means fixedly mounting said obstructing devices in spaced relation to each other, and means securing said mounting means to said conveyer system for movement by the engagement of a parcel with each of said obstructing devices to remove the engaged obstructing device from its conveyer and projecting the obstructing device for the other conveyer into parcel obstructing position.

7. In a conveyer system in which a pair of branch conveyers converge at a junction point into a single continuing conveyer, a parcel engaging obstructing device for each of said branch conveyers, means fixedly mounting said obstructing devices in spaced relation to each other, and means pivotally securing said mounting means to said conveyer system at a point spaced rearwardly of the position of said obstructing devices in said branch conveyers for movement by engagement of either of said obstructing devices by parcels on its associated branch conveyer to remove the engaged obstructing device and to project the obstructing device of the other conveyer into obstructing position.

8. In a conveyer system in which a pair of branch conveyers converge at a junction point, a lever pivoted between said branch conveyers, a pair of parcel-engaging devices mounted upon said lever in spaced relation to each other laterally of the direction of movement of parcels on said conveyers, and projecting into the path of parcels upon said conveyers whereby engagement of one of said obstructing devices by a parcel on one of said conveyers moves said lever about its pivot toward the other of said branch conveyers to remove said first named obstructing device from the path of the engaging parcel and placing the other of said obstructing devices in the path of the parcels on said other branch conveyer.

9. In a conveyer system in which a pair of branch conveyers converge at a junction point, a lever pivoted between said branch conveyers, a pair of parcel-engaging devices mounted upon said lever in spaced relation to each other laterally of the direction of movement of parcels on said conveyers, and projecting into the path of parcels upon said conveyers whereby engagement of one of said obstructing devices by a parcel on one of said conveyers moves said lever about its pivot toward the other of said branch conveyers to remove said first named obstructing device from the path of the engaging parcel and placing the other of said obstructing devices in the path of the parcels on said other branch conveyer, a second pair of parcel-engaging devices mounted upon said lever and spaced from the first parcel-engaging devices in the direction of movement of parcels into said junction point to hold said lever in the position to which it is moved until the engaging parcel has passed beyond said second parcel-engaging devices.

10. In a conveyer system in which a pair of branch conveyers converge at a junction point into a single continuing conveyer, a lever pivoted between said branch conveyers and extending toward said junction point, a cross bar on said lever extending laterally of the direction of movement of parcels into said junction point, a roller upon each end of said cross bar, one of said rollers extending into the path of parcels on one of said branch conveyers and the other of said rollers extending into the path of parcels on the other of said branch conveyers whereby engagement of one of the rollers by a parcel on its associated conveyer will move said lever toward the other conveyer to move the first named roller out of obstructing position and the second named roller into obstructing position.

11. In a conveyer system in which a pair of branch conveyers converge at a junction point into a single continuing conveyer, a lever pivoted between said branch conveyers and extending toward said junction point, a cross bar on said lever extending laterally of the direction of movement of parcels into said junction point, a roller upon each end of said cross bar, one of said rollers extending into the path of parcels on one of said branch conveyers and the other of said rollers extending into the path of parcels on the other of said branch conveyers whereby engagement of one of the rollers by a parcel on its associated conveyer will move said lever toward the other conveyer to move the first named roller out of obstructing position and the second named roller into obstructing position, a second cross bar on said lever spaced from the first named cross bar in the direction of movement of parcels into said junction point, a second pair of rollers on said second cross bar, one extending into the path of parcels on one of said conveyers and the other extending into the path of parcels on said other conveyer whereby said lever is maintained in the position to which it is moved until the engaging parcel passes beyond the rollers on the second cross bar.

Signed at Riverside, California, this 13th day of Jan., 1931.

HERBERT E. TWOMLEY.